Aug. 15, 1939  R. B. COTTRELL  2,169,960
BRAKE
Filed Oct. 10, 1936  3 Sheets-Sheet 1

Inventor:
Robert B. Cottrell
By (signature)
Attorney

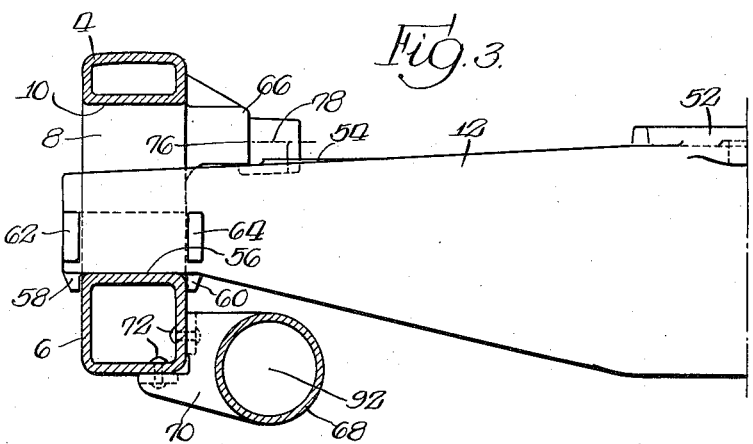
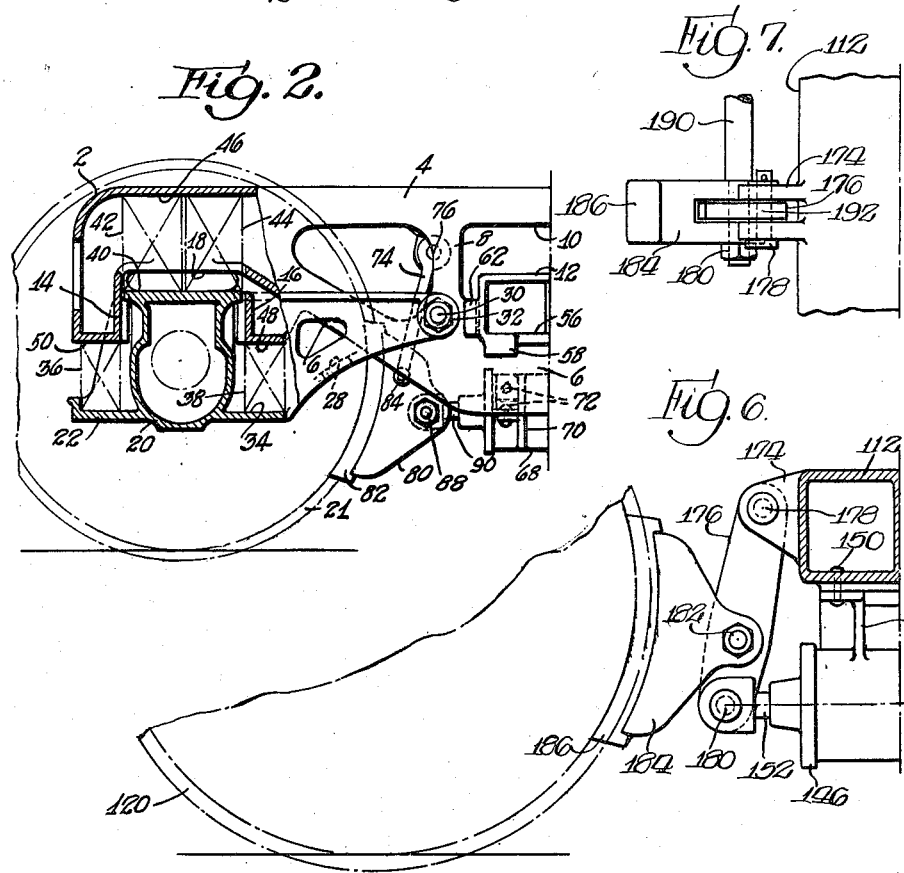

Aug. 15, 1939. R. B. COTTRELL 2,169,960
BRAKE
Filed Oct. 10, 1936 3 Sheets-Sheet 3

Inventor:—
Robert B. Cottrell,
By Orin O. B. Garner Atty.

Patented Aug. 15, 1939

2,169,960

UNITED STATES PATENT OFFICE 2,169,960

BRAKE

Robert B. Cottrell, Chicago, Ill., assignor to American Steel Foundries, Chicago, Ill., a corporation of New Jersey Application October 10, 1936, Serial No. 105,067

9 Claims. (Cl. 188—53)

My invention pertains to railway brake equipment.

It may be noted that, in most common types of railway trucks, various forms of spring suspensions are interposed between the load carrying members and the side frames thus permitting varying amounts of relative vertical motion between the load carrying member and the side frame upon which it is supported. In certain types of trucks, however, the spring means or snubbing devices are supported directly over the axle and not interposed between the side frame members and the load carrying members and, accordingly, in such a truck there is no relative vertical motion between the load carrying member and the side frame. My invention relates to brake rigging for trucks of the last mentioned type.

An object of my invention is to provide a novel form of brake equipment for a railway car truck wherein the load carrying member and the side frame have no vertical movement relative to each other.

A further object of my invention is to provide brake equipment for a railway truck of the above described type wherein the power means or brake cylinder may be supported either from the load carrying member or from the side frame.

A still further object of my invention is to provide brake equipment for a railway truck of the above mentioned design wherein the connection between the power means and the brake rigging will be as simple and direct as practicable with consequent saving in lost motion, number of parts and wear between parts.

With these and various other objects in view the invention may consist of certain features of construction and operation as will be more fully described and particularly pointed out in the specification, drawings and claims appended hereto.

In the drawings which illustrate embodiments of the device and wherein like reference characters are used to designate like parts—

Figure 2 is a side elevation of the truck and brake structure shown in Figure 1, a fragmentary portion of the structure being shown in section, the section being taken adjacent the journal box substantially in the vertical plane bisecting the side frame longitudinally;

Figure 3 is a sectional view of the truck and brake structure shown in Figures 1 and 2, the section being taken substantially in the vertical plane bisecting the truck transversely;

Figure 6 is a side elevation, partly in section, of a modification of the brake arrangement for the truck construction shown in Figures 4 and 5, the section being taken through the bolster substantially in the plane indicated by the line 6—6 of Figure 4;

Figure 7 is a fragmentary top plan view of the truck and brake arrangement shown in Figure 6.

Figure 1:
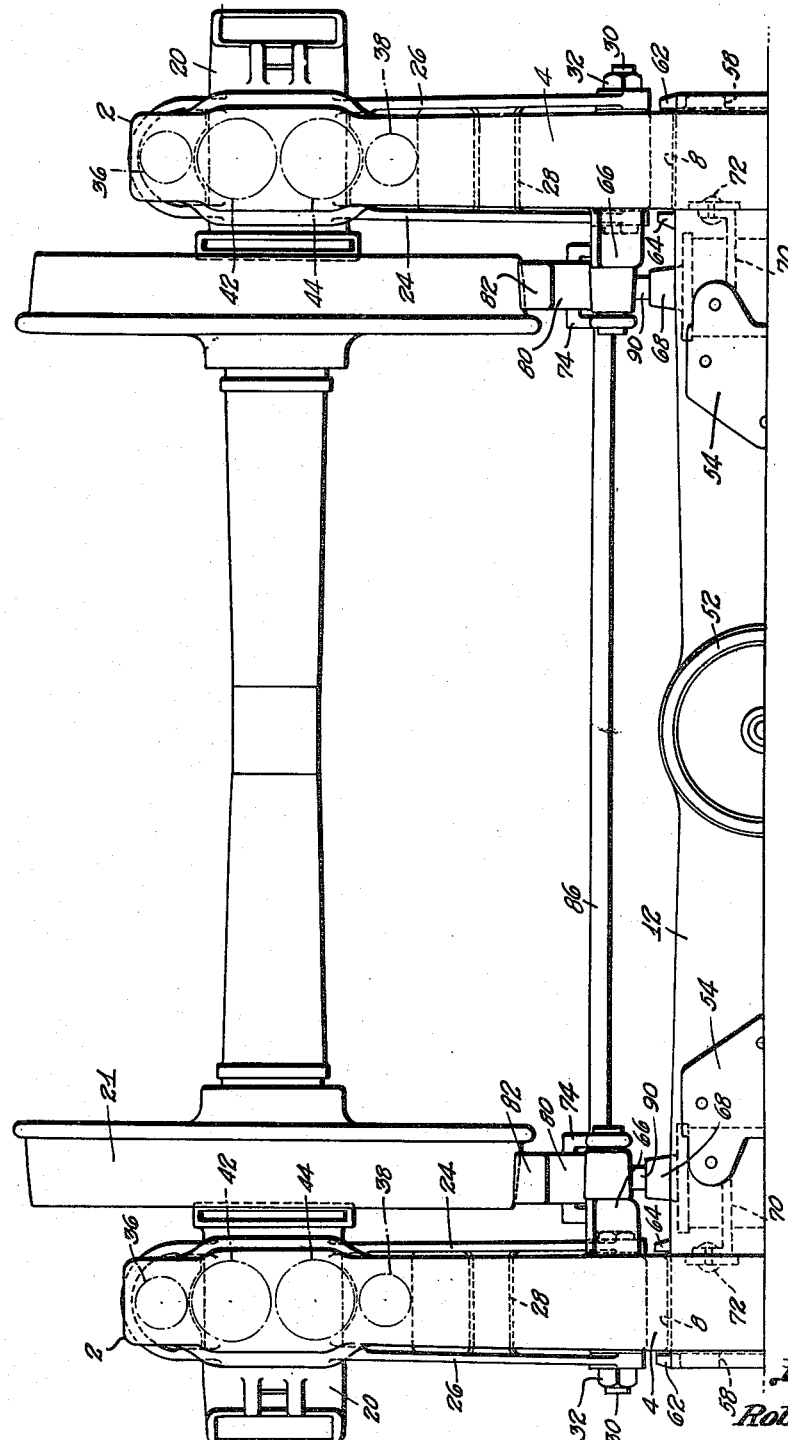
Figure 1 is a top plan view of the truck and brake construction embodying one form of my invention, only one end of the truck being shown inasmuch as the structure is the same at the opposite ends and on the opposite sides thereof.

Describing in more detail the truck and brake structures shown in Figures 1 to 3, inclusive, the truck comprises spaced side frames 2 of truss type having the compression member 4 and the tension member 6 joined by the integrally formed spaced column guides 8—8 forming therebetween the window opening 10 within which may be received the end of the load carrying member 12. Adjacent each end, the side frame 2 has the integrally formed pedestals 14 and 16 forming therebetween the pedestal opening 18 within which may be received the cooperating portion of the pivoted journal box and spring seat member 20, said member having cooperation with the journal portion of the wheel and axle assembly 21. Outwardly of the journal, the member 20 has the integrally formed spring sprocket 22 and inwardly of the journal this member 20 has the integrally formed inner and outer bracket arms 24 and 26 integrally joined by the reinforcing member 28 extending between their bottom edges. The diagonal portion of the tension member 6 is received between the inner and outer bracket arms 24 and 26 and the extremities of the said bracket arms 24 and 26 are pivotally secured to the side frame as at 30 approximately at the juncture of the column 8 and the tension member 6, being secured thereto by means of the bolt and nut assembly 32. Inwardly of the journal, the member 20 has an integrally formed spring seat 34 and upon the outer and inner spring seats 22 and 34 may be seated outer and inner spring or snubber supporting means diagrammatically shown at 36 and 38 respectively. The upper surface of the member 20 may likewise form a spring seat as at 40 for the reception of other support means in the form of springs or snubbing devices diagrammatically indicated at 42 and 44 and upon the said spring or snubber means thus seated may be supported the side frame, the seat for the spring means 42 and 44 being provided on the inner surface of the compression member of the side frame as at 46 and upper seats for the spring means 34 and 36 being provided on the bottom surfaces of the inner and outer pedestals of the side frame as at 48 and 50 respectively.

The load carrying member or bolster 12 has the usual center bearing 52 and the side bearings 54. The end of the bolster may be inserted through the wider portion at the top of the window opening 10 and seated upon the upper surface of the tension member centrally thereof as at 56, being secured in position as by means of the downwardly extending outer and inner lugs 58 and 60 and the laterally projecting lugs 62 and 64.

Upon the inner face of the side frame 2 and approximately at the juncture of the column 8 with the compression member 4 is the integrally formed brake hanger bracket 66. The double acting power means or brake cylinder 68 may be secured to the tension member 6, being joined thereto by the brackets 70 integrally formed with said cylinder, said brackets being secured to said tension member as by means of the rivets 72—72.

The brake hanger 74 is pivotally supported as at 76 from the brake hanger bracket 66, the center of suspension indicated at 78 (Figure 3) being such that the brake head 80, with its associated brake shoe 82 pivotally supported as at 84 from the hanger 74, is properly aligned with the braking surface of the adjacent wheel. The tie rod 86 is secured to the brake head 80 at the pivot point 88 and at the said pivot point is likewise connected the piston 90 forming a part of the power means 68.

The center of pressure of the power means 68 as indicated at 92 (Figure 3) is located approximately in the same vertical longitudinal plane with the center of suspension 78, the said vertical longitudinal plane substantially bisecting the tread surfaces of the wheels at the respective ends of the truck.

In operation, actuation of the power means 68 will cause the piston 90 to move outwardly and, through the direct pivotal connection of the piston 90 with the brake head 80, will cause the said brake head to move outwardly until the brake shoe 82 supported thereon is brought into engagement with the tread surface of the adjacent wheel. Release of the power means will cause the parts to move in the reverse directions until they have assumed their normal inoperative position. It will be understood, of course, that the power means 68 operates in conjunction with similar power means at the opposite side of the truck and that each of said power means is double acting, that is to say, is provided with oppositely acting pistons at each end, thus actuating the braking means associated with the wheel and axle assemblies at opposite ends of the truck.

Figure 4:
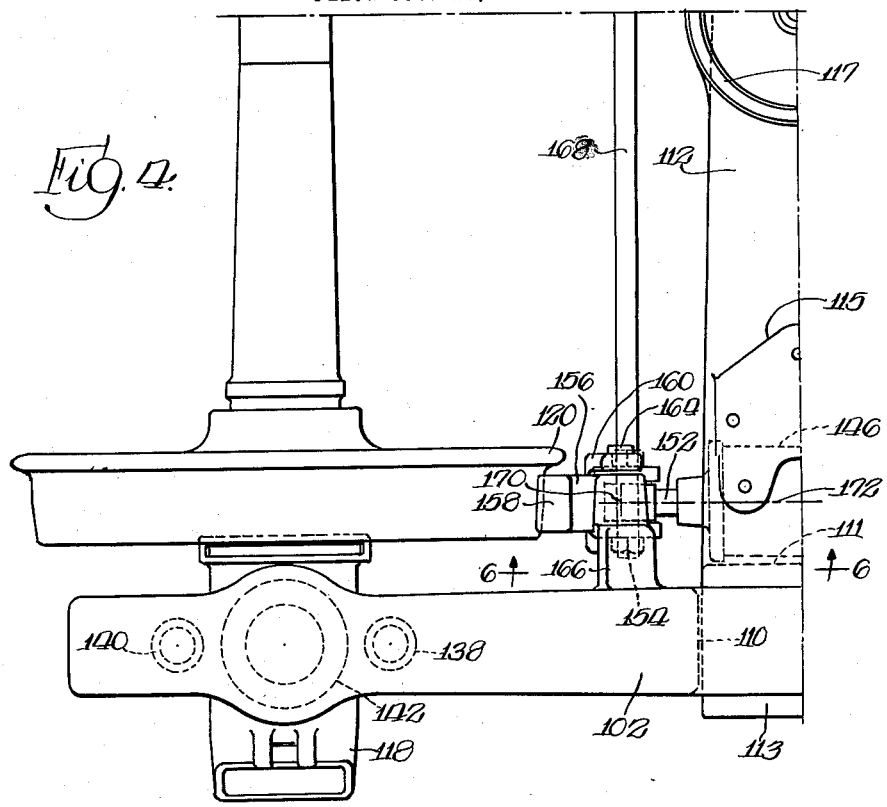
Figure 4 is a top plan view of a truck and brake structure embodying another form of my invention, only one end of the truck being shown since the structure is the same on the opposite sides and at the respective ends of the truck.
Figure 5:
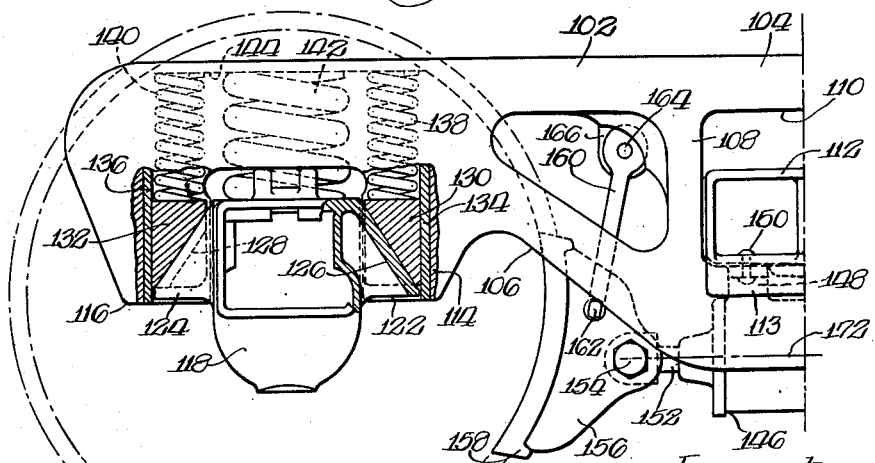
Figure 5 is a side elevation of the truck and brake structure shown in Figure 4, a fragmentary section being shown through the connection of the side frame with the journal portion of the wheel and axle assembly, the section being taken substantially in the vertical plane bisecting the side frame longitudinally.

In the embodiment of my invention shown in Figures 4 and 5, the truck comprises the side frame 102 of a well-known truss type having the compression member 104 and the tension member 106 joined intermediate their ends by the integrally formed spaced columns 108 forming therebetween the window opening 110 for the reception of the end of the load carrying member or bolster 112, said bolster being secured in position by the inner and outer depending lugs 111 and 113 and being provided with the usual side bearings 115 and center bearing 117. Adjacent each end, the side frame 102 has the integrally formed inner and outer column guides 114 and 116 between which may be received the cooperating side portions of the journal box 118 providing the usual form of cooperation with the journal portion (not shown) of the wheel and axle assembly 120.

The journal box 118 is of a special form having the inner and outer wing portions 122 and 124, said wind portions having the sloping walls 126 and 128 upon which may be seated respectively the wedge-shaped friction blocks 130 and 132. The vertical faces of the friction blocks have engagement with the wear plates 134 and 136 secured respectively to the column guides 114 and 116. The upper or horizontal faces of the friction blocks provide seats for auxiliary coil springs 138 and 140 positioned on the opposite sides of the main coil spring 142 which is centrally seated on the top of the journal box, all of said springs having their upper ends abutting against the spring seat 144 formed on the ceiling of the spring receiving cavity in the end of the side frame. It will be observed that, in this form of truck, relative vertical motion will occur between the side frame and the wheel and axle assemblies, said vertical movement being damped by the friction developed between the wedge blocks 130 and 132 engaging against the wear plates 134 and 136 respectively and being urged into engagement therewith by the springs 138 and 140 respectively superposed upon the before-mentioned friction blocks 130 and 132. It will be further noted that the side frames 102 and the load carrying member or bolster 112 which joins them have no relative vertical motion but move as a unit.

The double acting brake cylinder 146 has the integrally formed brackets 148 forming a means of attachment to the bottom wall of said bolster and being secured thereto as by means of rivets 150. The piston 152 of the power means 146 is pivotally and directly connected as at 154 to the brake head 156, said brake head carrying a brake shoe 158 arranged for engagement with the tread surface of the adjacent wheel. The lower end of the brake hanger 160 is pivotally connected as at 162 to the brake head 156 and is pivotally supported at its upper end as at 164 from the brake hanger bracket 166 integrally formed on the side frame 102. At the pivotal point 154 the tie rod 168 is connected to the brake head 156 thus securing together the brake heads at the opposite sides of the truck. The center of suspension of the brake hanger 160 indicated at 170 (Figure 4) is located approximately in the vertical longitudinal plane bisecting the tread surface of the adjacent wheel. The brake cylinder 146 has its center of pressure 172 located in the same plane and directly below the said center of suspension 170 of the brake hanger 160.

In operation, actuation of the double acting brake cylinder or power means 146 will cause the piston 152 to move to the left, thus moving the brake head 156 to the left and bringing the brake shoe 158 into engagement with the tread surface of the associated wheel. It will be understood that the corresponding double acting cylinder mounted on the opposite side of the truck will operate in conjunction with the double acting cylinder 146 and also that the similar rigging at the opposite end of the truck will likewise be actuated by the pistons at the opposite ends of the cylinders.

Figures 6 and 7 show a modified form of support for the brake rigging in the truck shown in Figures 4 and 5. In this modification it will be observed that the bolster 112 has the integrally formed laterally projecting bracket 174 providing a pivotal means of support for the hanger lever 176, said hanger lever being pivotally connected thereto as at 178. The lower end of the hanger lever 176 is pivotally connected as at 180 to the piston 152 forming a part of the power means 146. Intermediate the ends of the hanger lever 176 is pivotally supported as at 182 the brake head 184 with its associated brake shoe 186 arranged for engagement with the periphery of the adjacent wheel. At the pivotal point 182 where the brake head 184 is supported on the hanger 176 is also connected the tie rod 190, said tie rod thus providing a connection between the brake heads and hanger levers at the opposite sides of the truck. In this embodiment it will likewise be observed that the point of support of the hanger lever 176 indicated at 192 (Figure 7) is located approximately in the vertical plane which bisects the tread surface of the adjacent wheel and in the same plane is located the pressure center 172 of the cylinder or power means 146.

It will be observed that in all of these embodiments I have provided a substantially direct connection between the double acting power means and an exceedingly simple form of brake rigging mounted at each end of a truck wherein there is no relative vertical motion between the side frames of the truck and the transverse load carrying member. I have thus provided maximum simplicity, in this manner conserving space and reducing the number of parts to a minimum.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a railway car truck the combination of a truck frame comprising side members, a load carrying member connecting said side members and supported directly thereon, a plurality of power means supported at the opposite ends of said load carrying member, wheel and axle assemblies, pairs of hanger levers hung from the opposite ends of said load carrying member and pivotally supporting brake heads intermediate their ends for cooperation with the adjacent wheels, direct pivotal connections between the lower ends of said hanger levers and pistons associated with the opposite ends of the adjacent power means, and tie rods connecting the brake heads at opposite sides of the truck at their before-mentioned pivotal points of support.

2. In a railway car truck the combination of a truck frame comprising side members and a load carrying member supported directly thereon, wheel and axle assemblies, journal means supported on said wheel and axle assemblies and supporting said side members through resilient means, pairs of hanger levers supported at the opposite ends of said load carrying member, a brake head supported on each of said hanger levers intermediate its ends, a direct connection between the lower end of each of said hanger levers and a piston associated with one of said power means, and tie rods connecting corresponding brake heads at opposite sides of the truck, said tie rods being connected to said brake heads at the points where said heads are supported.

3. In a railway car truck the combination of a truck frame comprising side members, a load carrying member connecting said side members and supported directly thereon, wheel and axle assemblies, spaced hangers hung from each of said side members intermediate the wheels and supporting brake heads adjacent said wheels at opposite ends of the truck, double acting power means supported from one of said members and directly connected between said brake heads at each side of said truck, the centers of suspension of said hangers on one side of said truck and the center of pressure of the associated power means lying substantially in the same vertical plane, and tie rods connecting corresponding brake heads at opposite sides of the truck, said tie rods being connected at the points where said power means are connected.

4. In a railway car truck the combination of a truck frame comprising side members, a load carrying member connecting said side members and supported directly thereon, a plurality of double acting power means supported from one of said members, each of said power means comprising a plurality of pistons, brake heads supported for cooperation with wheels at the opposite ends of said truck, the brake heads on each side of said truck having direct pivotal connections with the adjacent pistons of one of said power means, and tie rods connecting corresponding brake heads at opposite sides of the truck, said tie rods being connected at said pivotal points.

5. In a railway car truck the combination of a truck frame comprising side members, a load carrying member connecting said side members and supported directly thereon, double acting power means supported from one of said members, and brake heads supported for cooperation with wheels at the opposite ends of said truck, said brake heads at each side of said truck having direct pivotal connections with the pistons of adjacent power means, the corresponding brake heads at opposite sides of said truck having interconnecting tie rods secured to said pivotal connections.

6. In a railway car truck the combination of a truck frame comprising side members, a load carrying member connecting said side members and supported directly thereon, a plurality of power means supported at the opposite ends of said load carrying member, wheel and axle assemblies, pairs of hanger levers hung from the opposite ends of said load carrying member and supporting brake heads intermediate their ends for cooperation with the adjacent wheels, direct pivotal connections between the lower ends of said hanger levers and pistons associated with the opposite ends of the adjacent power means, and tie rods connecting corresponding brake heads at opposite sides of the truck, said tie rods being secured at the points where said brake heads are supported.

7. In a railway car truck the combination of a truck frame including side members and a load carrying member supported thereon, double acting power means supported from certain of said members at opposite sides of the truck, brake heads supported for cooperation with wheels at the opposite sides of said truck and having pivotal connections to the pistons of the adjacent power means, and tie rods connecting corresponding pivotal connections at opposite sides of the truck.

8. In a railway car truck the combination of a truck frame including side members and a supported load carrying member, wheel and axle assemblies, double acting power means supported from certain of said members intermediate the wheels, brake heads supporting brake shoes intermediate said wheels, said brake heads at each side of the truck having pivotal connections to pistons of the adjacent power means, and tie rods interconnected between the corresponding pivotal connections at opposite sides of the truck.

9. In a railway car truck the combination of a truck frame comprising spaced side members, a load carrying member connecting said side members and directly supported thereon, wheel and axle assemblies, spaced hangers hung from each of said side members intermediate the wheels and supporting brake heads for cooperation therewith, double acting power means supported from each of said side members and having direct pivotal connections with the adjacent brake heads, and tie rods connecting corresponding brake heads on the opposite sides of said truck at said pivotal points.

ROBERT B. COTTRELL.